United States Patent Office.

W. B. FINCH, OF CHICAGO, ILLINOIS, ASSIGNOR TO HIMSELF, THOMAS S. FERGUSON, AND N. B. BOYDEN.

Letters Patent No. 72,617, dated December 24, 1867.

IMPROVED VARNISH PAINT.

*The Schedule referred to in these Letters Patent and making part of the same.*

TO ALL WHOM IT MAY CONCERN:

Be it known that I, W. B. FINCH, of Chicago, in the county of Cook, in the State of Illinois, have invented an Improved Paint; and I do hereby declare that the following is a full and exact description thereof, reference being had to the accompanying specimen ingredients.

The nature of my invention consists in the use of India rubber, boiled linseed oil, rosin, gum-shellac, and benzole, prepared and compounded as hereinafter described.

I first take two parts of India rubber, and cut it in small pieces and put it into a jug or other tight vessel, and cover the rubber with equal parts of coal-tar and benzole, after which the three ingredients are subjected to heat in boiling water twelve hours; or the rubber may be soaked in coal-tar and benzole (or benzole only) long enough to soften, and then added to the linseed oil to dissolve, as described in the specification. The mixture is then put into a kettle with boiled linseed oil, and boiled until the rubber is dissolved, at which time thirty parts of rosin are added, and as soon as it is melted, one part of gum-shellac is added. The mixture should be thoroughly stirred, in order that all of the ingredients may be incorporated with each other. Forty-eight parts of benzole should be gradually added to it, and the whole compound strained for use, and kept as much as possible from the atmosphere.

In the preparation of the rubber, when being boiled, it is not especially necessary that coal-tar be used with benzole, as the latter material will answer the purpose. Nor is it necessary that the several ingredients be used in proportions set forth; but if the directions given are adhered to, the paint will be better, and fully answer all practical purposes attained by any other paint now in use. Any color may be added to the paint as readily as to oil or other material now used for a similar purpose.

A paint prepared and compounded as above, possesses a degree of durability, cheapness, and gloss not found in other paints now in use, and as the process of manufacture is very simple, no person having ordinary skill in the art need experience any difficulty in preparing this paint for use.

What I claim, and desire to secure by Letters Patent, is—

A paint, composed of India rubber, linseed oil, rosin, gum-shellac, and benzole.

W. B. FINCH.

Witnesses:
 GEO. L. CHAPIN,
 A. HAYWARD.